United States Patent [19]

Reiss

[11] Patent Number: 5,015,271
[45] Date of Patent: May 14, 1991

[54] SEPARATION OF GAS MIXTURES BY VACUUM SWING ADSORPTION (VSA) IN A TWO-ADSORBER SYSTEM

[75] Inventor: Gerhard Reiss, Leverkusen, Fed. Rep. of Germany

[73] Assignee: Bayer Aktiengesellschaft, Leverkusen, Fed. Rep. of Germany

[21] Appl. No.: 397,696

[22] Filed: Aug. 23, 1989

[30] Foreign Application Priority Data

Sep. 1, 1988 [DE] Fed. Rep. of Germany ....... 3829584

[51] Int. Cl.⁵ .............................................. B01D 53/04
[52] U.S. Cl. .......................................... 55/25; 55/58; 55/66; 55/68; 55/75
[58] Field of Search ................... 55/25, 26, 58, 62, 68, 55/74, 75, 66

[56] References Cited

U.S. PATENT DOCUMENTS

| | | | |
|---|---|---|---|
| 3,280,536 | 10/1966 | Berlin | 55/58 |
| 3,338,030 | 8/1967 | Feldbauer, Jr. | 55/25 |
| 3,636,679 | 1/1972 | Batta | 55/62 X |
| 3,638,398 | 2/1972 | Domine et al. | 55/25 |
| 3,717,974 | 2/1973 | Batta | 55/62 X |
| 3,738,087 | 6/1973 | McCombs | 55/58 |
| 3,788,036 | 1/1974 | Lee et al. | 55/25 |
| 3,796,022 | 3/1974 | Simonet et al. | 55/25 |
| 3,923,477 | 12/1975 | Armond et al. | 55/25 |
| 3,957,463 | 5/1976 | Drissel et al. | 55/25 |
| 3,973,931 | 8/1976 | Collins | 55/58 |
| 4,065,272 | 12/1977 | Armond | 55/25 |
| 4,264,340 | 4/1981 | Sircar et al. | 55/25 |
| 4,552,571 | 11/1985 | Dechene | 55/25 X |
| 4,614,525 | 9/1986 | Reiss | 55/25 |
| 4,648,888 | 3/1987 | Rowland | 55/25 X |
| 4,684,377 | 8/1987 | Haruna et al. | 55/26 |
| 4,756,723 | 7/1988 | Sircar | 55/25 |
| 4,810,265 | 3/1989 | Lagree et al. | 55/26 |
| 4,857,083 | 8/1989 | DiMartino | 55/26 |

FOREIGN PATENT DOCUMENTS

| | | | |
|---|---|---|---|
| 56-062515 | 5/1981 | Japan | 55/25 |
| 62-038219 | 2/1987 | Japan | 55/25 |
| 2154895 | 9/1985 | United Kingdom . | |

OTHER PUBLICATIONS

Tappipress, 1987 Int. Oxygen Delignification Conference pp. 151-153.

*Primary Examiner*—Robert Spitzer
*Attorney, Agent, or Firm*—Sprung, Horn, Kramer & Woods

[57] ABSTRACT

2-adsorber systems of the VSA process have been found which, surprisingly, require only a slightly higher energy consumption in comparison with the 3-adsorber systems, but are considerably more favorable in terms of investment in the plant because of the small number of valves and adsorbers, and in particular adsorptive separation of a gas mixture (crude gas) in containers (adsorbers) filled with adsorbent, with the phase which is adsorbed less strongly, if at all, being obtained and the adsorbed gas content (adsorbate) being desorbed under reduced pressure, e.g. by means of a vacuum pump has been found. The process is characterized in that two adsorbers (A and B) are operated alternately so that the crude gas feed and also the desorption of the adsorbate, i.e. connection of the vacuum pump, is not stopped at any time during the separation process, separation of the crude gas partly taking place under reduced pressure when the maximum adsorption pressure has been reached.

7 Claims, 11 Drawing Sheets

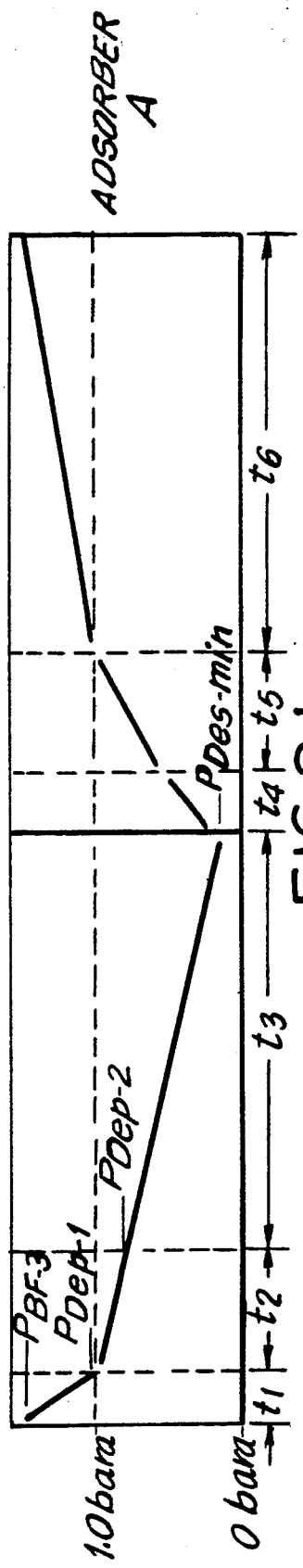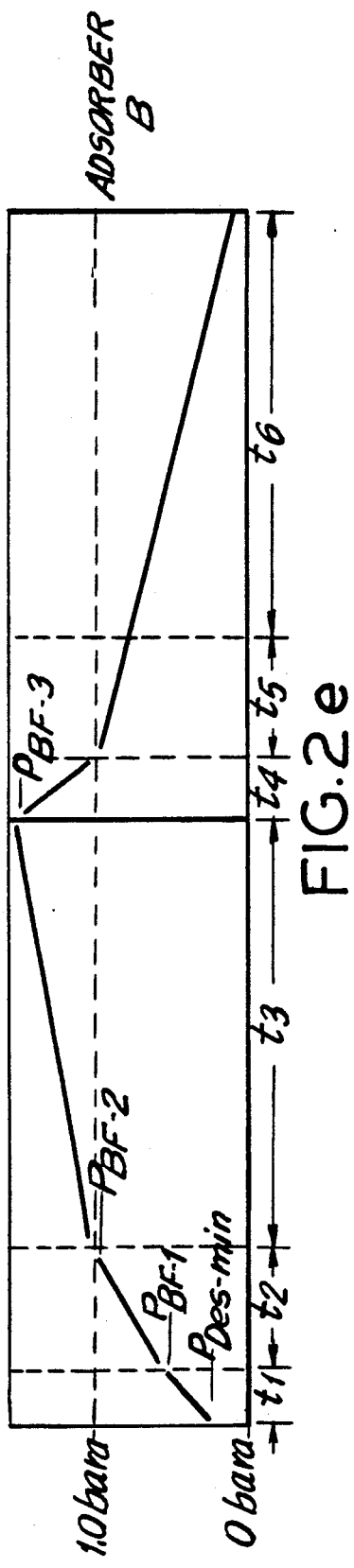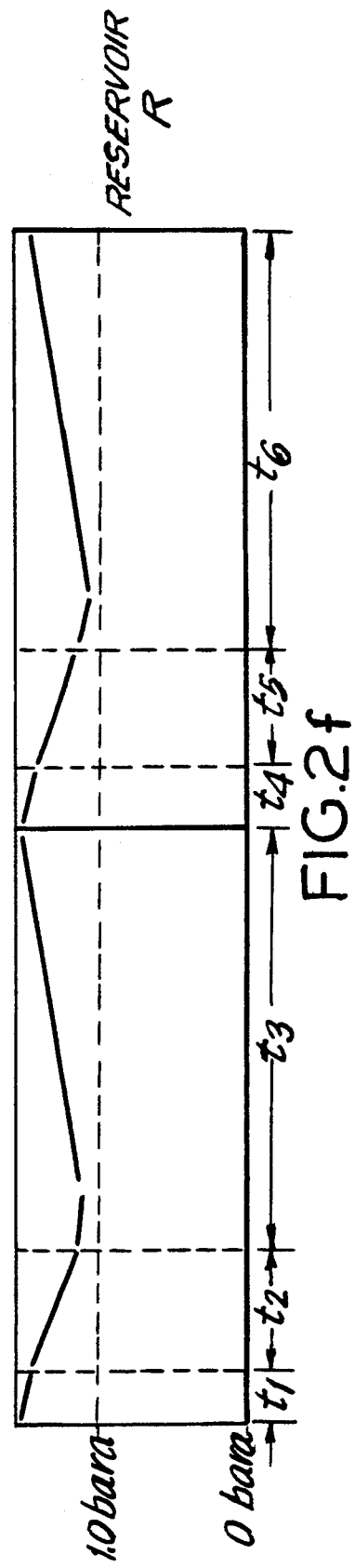

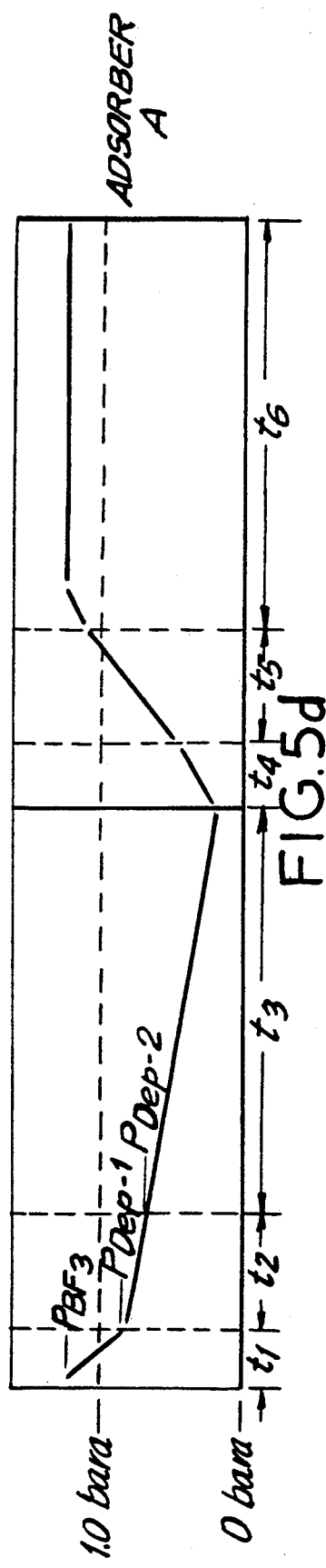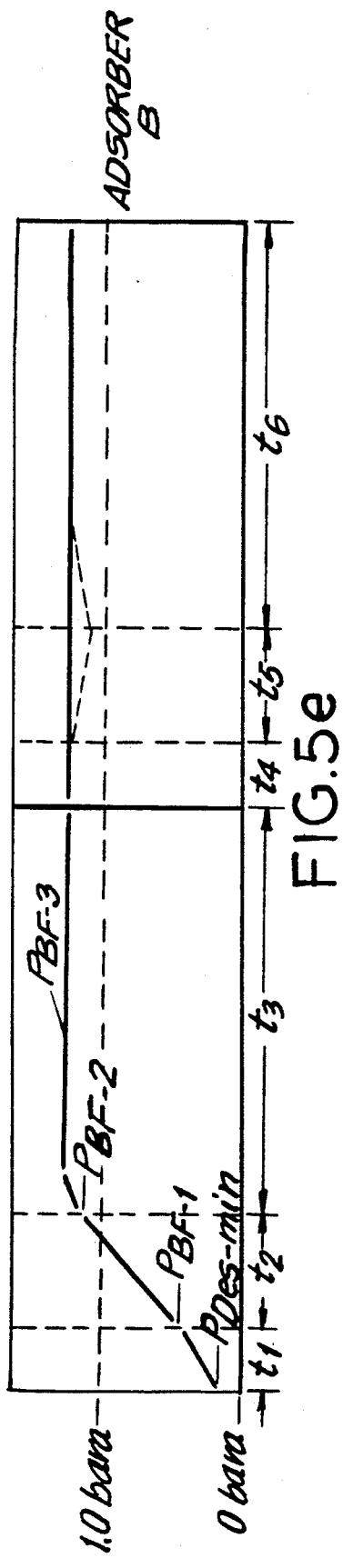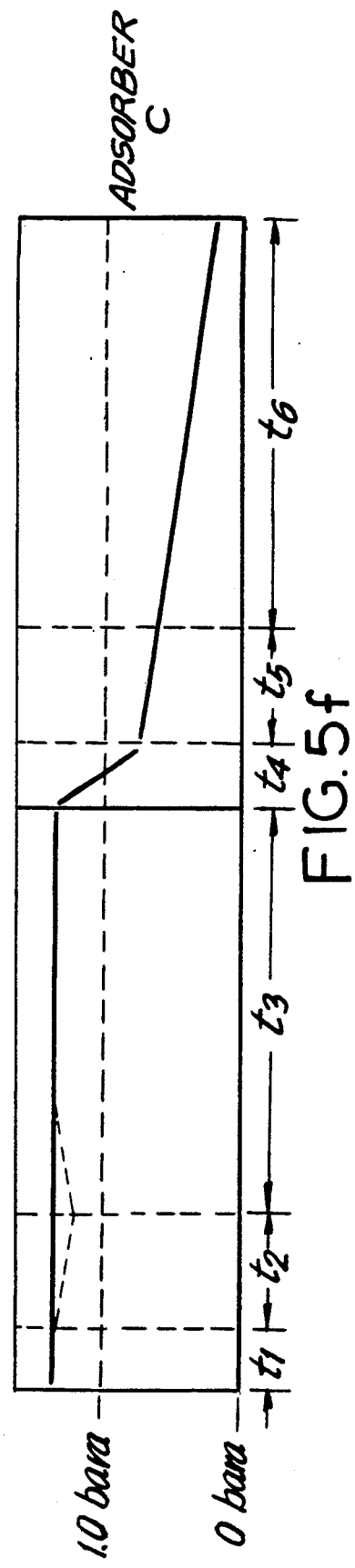

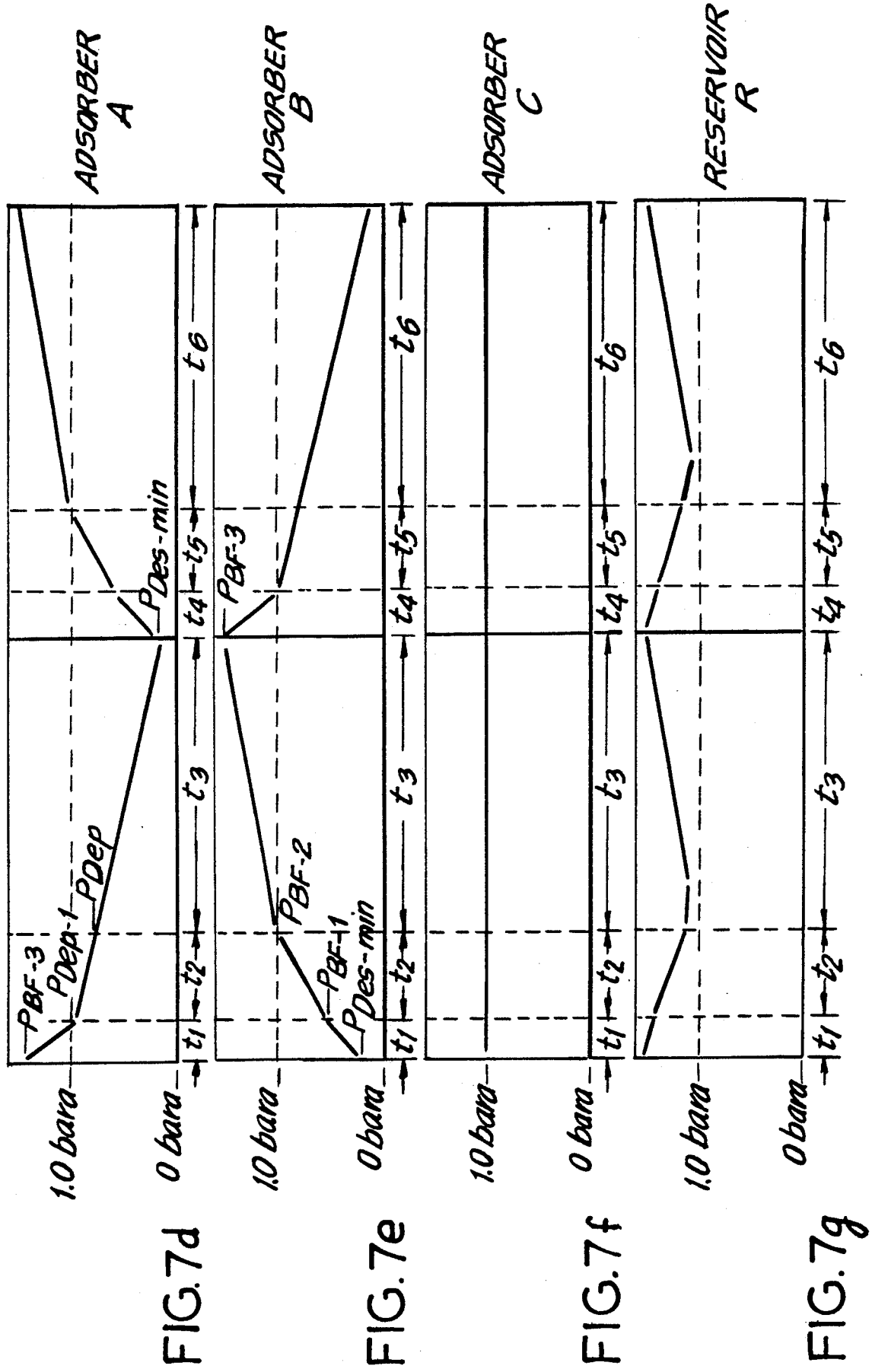

SEPARATION OF GAS MIXTURES BY VACUUM SWING ADSORPTION (VSA) IN A TWO-ADSORBER SYSTEM

The present invention relates to an improved and simple process for adsorptive separation of gas mixtures, in particular of air, by means of inorganic adsorbents, in particular molecular sieve zeolites.

Adsorptive separation of gas mixtures with the aid of pressure swing adsorption has been known for more than 20 years, the most diverse separation processes having since been developed. However, all the processes are based on a procedure in which the gas content of the gas mixture (crude gas), which has the higher affinity for the adsorbent, is held on the surface of the adsorbent in a so-called adsorber in a so-called adsorption step and the less strongly adsorbed components can be stripped off from the adsorber filled with adsorbent.

Desorption of the adsorbed phase is always achieved by reducing the pressure after the adsorption step and usually with rinsing of the adsorbent with some of the gas adsorbed less strongly, and in particular under a pressure of 1 bar or more. PSA systems (pressure swing adsorption) are referred to here. If the pressure is reduced to a pressure of less than 1 bar by means of a vacuum pump, the adsorbent is also rinsed with some of the gas adsorbed less strongly, but there are also cases where rinsing is dispensed with here, e.g. in the oxygen-enrichment of air by means of molecular sieve zeolites. These processes using vacuum desorption are called VSA (vacuum swing adsorption).

After the desorption step, the adsorbent is always filled with gas up to the pressure of the adsorption step, and in cases of PSA adsorption with the gas content adsorbed less strongly or crude gas or with both at the same time. In the case of the VSA technique, the gas content which is adsorbed less strongly is used for filling.

The above separation processes are therefore divided into three steps: Adsorption (separation), desorption (reduction in pressure) and refilling (build-up of pressure), which is why three adsorbers are needed for a PSA/VSA process which operates completely continuously.

It has become known that in the case of $O_2$-enrichment of air by means of the VSA process using MS (molecular sieve) zeolites with cocurrent filling of the adsorber with crude gas starting at a reduced pressure, only inadequate separation of the air has been achieved (Chemical Engineering Oct. 5, 1970, p. 54/55). Surprisingly, it has now been found that in spite of the introduction and separation of the crude gas under reduced pressure, oxygen concentrations in the product of far in excess of 90% can be achieved by the process according to the invention in the case of $O_2$-enrichment of air.

PSA systems with two adsorbers have already been developed for $O_2$-enrichment (U.S. Pat. No. 3,280,536). However, they operate in part discontinuously, since the supply of crude gas is interrupted at the start of the reduction in pressure. Compared with a 3-adsorber system, these 2-bed systems have a considerably higher energy consumption of the crude gas compressor (Tappipress, 1987 Int. Oxygen Delignification Conference, p. 153).

2-adsorber systems of the VSA process have now been found which, surprisingly, require only a slightly higher energy consumption in comparison with the 3-adsorber systems, but are considerably more favorable in terms of investment in the plant because of the small number of valves and adsorbers, and in particular adsorptive separation of a gas mixture (crude gas) in containers (adsorbers) filled with adsorbent, with the phase which is adsorbed less strongly, if at all, being obtained and the adsorbed gas content (adsorbate) being desorbed under reduced pressure, e.g. by means of a vacuum pump has been found. The process is characterized in that two adsorbers (A and B) are operated alternately so that the crude gas feed and also the desorption of the adsorbate, i.e. connection of the vacuum pump, is not stopped at any time during the separation process, separation of the crude gas partly taking place under reduced pressure when the maximum adsorption pressure has been reached.

The process according to the invention is carried out in a typical form as follows (the designation BF means: refilling, Dep: reduction in pressure, Des: desorption):

(1a) At time $t_1$, the pressure $P_{BF-3}$ in adsorber A falls from more than 1 bar to $P_{Dep-1}$, expansion gas at the top end of adsorber A being passed into the top end of adsorber B, the lower end of adsorber A being connected to the vacuum pump, the lower end of adsorber B being filled with crude gas, which means that the pressure in adsorber B rises from its lowest pressure $P_{Des-min}$ to a higher pressure $P_{BF-1}$, or separation of the crude gas taking place under the reduced pressure, $P_{BF-1}$ being below 1 bar and being less than $P_{Dep-1}$, (1b) at time $t_2$, the pressure in adsorber A falls from $P_{Dep-1}$ to $P_{Dep-2}$ in that the top end of adsorber A is closed, the bottom end of adsorber A is connected to a vacuum pump, the pressure in adsorber B rises from $P_{BF-1}$ to a pressure $P_{BF-2}$, crude gas flowing in at the bottom end of adsorber B and being separated adsorptively under reduced pressure, and at the same time some of the less strongly adsorbed gas content (raffinate) flows, e.g. from a raffinate (R), in at the top end of adsorber B, this separation step $t_2$ being ended when the filling and separating pressure has reached at least 1 bar, (1c) at time $t_3$, the pressure in adsorber A falls from $P_{Dep-2}$ to its lowest desorption pressure $P_{Des-min}$, the top end of the adsorber being closed, the bottom end being connected to a vacuum pump and the pressure in adsorber B rising to a value $P_{BF-3}$, in that the crude gas enters at the bottom end of adsorber B, adsorptive separation takes place in the adsorber under a pressure of more than 1 bar and raffinate is stripped off at the top end of adsorber B under a pressure of more than 1 bar to not more than $P_{BF-3}$, (1d) the process is continued analogously to 1a/1b/1c by changing over the adsorbers A and B.

In another embodiment of the invention (2a) at time $t_1$, the pressure $P_{BF-3}$ in adsorber A is reduced from more than 1 bar to $P_{Dep-1}$, expansion gas at the top end of adsorber A being passed into the top end of adsorber B, the bottom end of adsorber A remaining connected to the crude gas stream, the bottom end of adsorber B remaining connected to the vacuum pump and the pressure in adsorber B in this way rising from its lowest value $P_{Des-min}$ to a pressure $P_{BF-1}$, $P_{BF-1}$ being below 1 bar and being less than $P_{Dep-1}$, (2b) at time $t_2$, as in the process section (1b) described, adsorber A is evacuated and adsorber B is filled with raffinate, e.g. from a raffinate reservoir, from the top end and with crude gas $P_{BF-2}$ from the bottom end, (2c) at time $t_3$, as in the process section (1c) described, adsorber A is evacuated and adsorber B is filled from the bottom end with crude gas, whereupon raffinate gas is stripped off as the product under a pressure from 1 bar to $P_{BF-3}$ at the top end of the adsorber B, (2d) the process is continued analogously to process steps 2a/2b/2c by changing over the adsorbers A and B.

Suitable adsorbents for the process according to the invention are molecular sieve zeolites, such as zeolite A and X in the Na form or in the form with replacement by divalent alkali metal or alkaline earth metal ions, such as Ca, Mg, Sr or mixtures thereof, or naturally occurring zeolites or synthetically prepared forms thereof, such as mordenite or chabazite.

Processes with 3 adsorbers are already known in the VSA field, in which e.g. an adsorber A is evacuated at the bottom end and at the same time gas is used at the top end for filling an evacuated adsorber B, but this adsorber B is not at the same time here filled with crude gas at the bottom end (U.S. Pat. No. 4,684,377), or product gas is likewise stripped off at the top end of adsorber A in a 3-adsorber system, this is introduced into the top end of adsorber B, the bottom end of adsorber B is connected to a vacuum pump but the bottom end of adsorber is not simultaneously here charged with crude gas (GB-PS No. 2,154,895). A combined PSA/VSA process with 2 adsorbers is known (U.S. Pat. No. 4,065,272), in which crude gas is fed continuously to the adsorbers but desorption of the adsorber or connection of the vacuum pump must be interrupted for this, in order to let the adsorber down to 1 bar, or to increase the pressure again with raffinate after evacuation.

BRIEF DESCRIPTION OF THE FIGURES

FIGS. 2a, 2b, 2c, 2d, 2e and 2f show process flow and pressure flow for example 1.

FIGS. 5a, 5b, 5c, 5d, 5e and 5f show the process flow and pressure flow for example 4.

FIGS. 7a, 7b, 7c, 7d, 7e, 7f and 7g show the process flow and pressure flow for remaining two adsorbers A and B.

SPECIFIC EMBODIMENTS AND DETAILED DESCRIPTIONS OF FIGURES

The VSA processes according to the invention are illustrated in more detail in the following examples.

The following data remain constant in all the examples:

| | |
|---|---|
| Adsorber internal diameter: | 550 mm |
| Adsorber filled height: | 2,500 |
| Adsorbent packing per adsorber: | 70 dm³ medium-pored | silica gel at the bottom end, remaining packing in each case 340 kg molecular sieve zeolite A in the Ca form. The raffinate reservoir had a volume of 3.6 m³. The crude gas fed in had a temperature of +30° C. and was always 75% saturated with water under 1 bar at 30° C. A lubrication ring pump adjustable via gearing was used as the vacuum pump. The crude gas was compressed via a Roots fan. The pressure was in each case measured at the bottom end of the adsorber.

EXAMPLE 1

Figure 1:
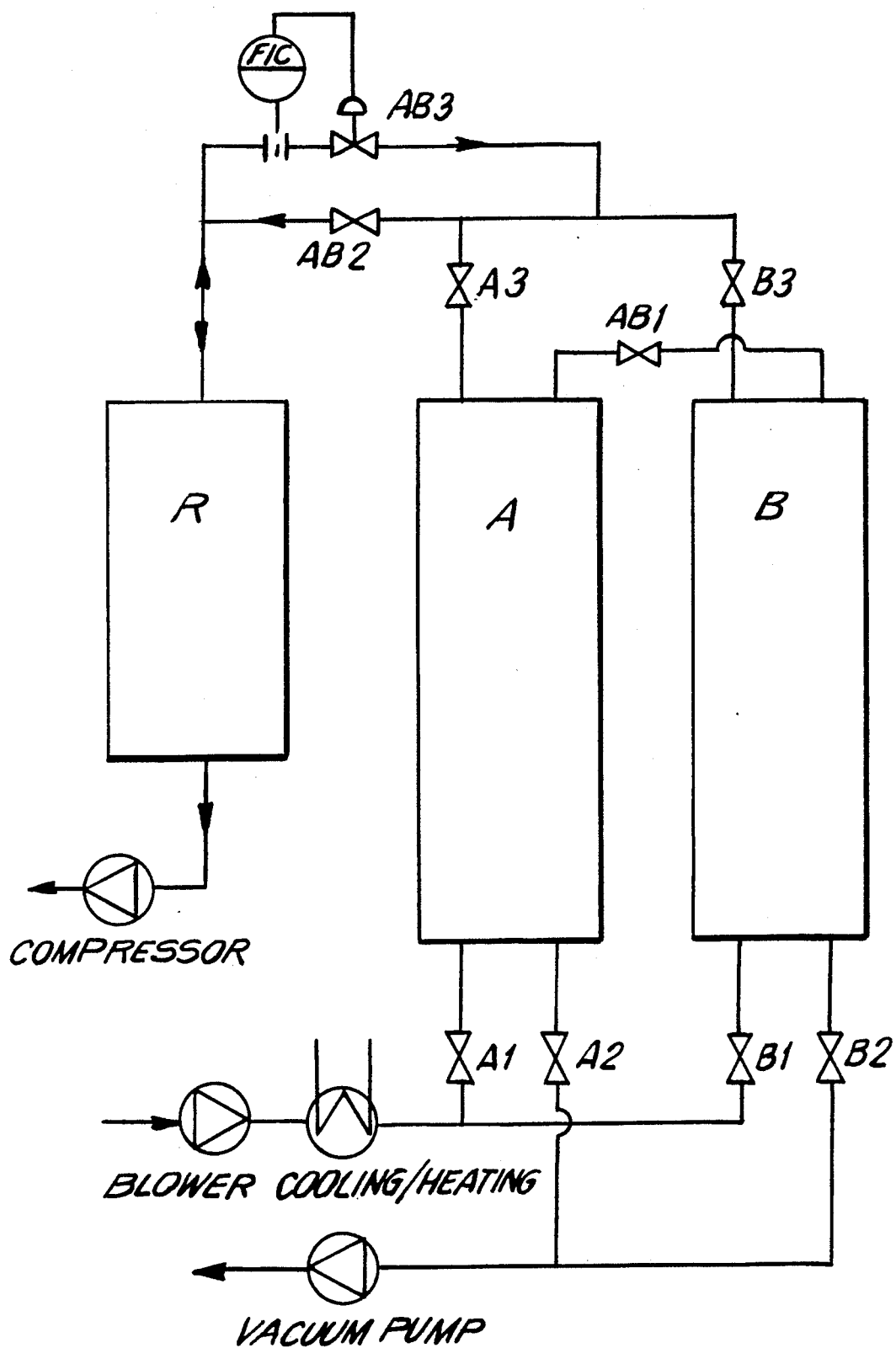
FIG. 1 shows an installation for carrying out the present process as shown in examples 1, 2 and 3.
Figure 2C:
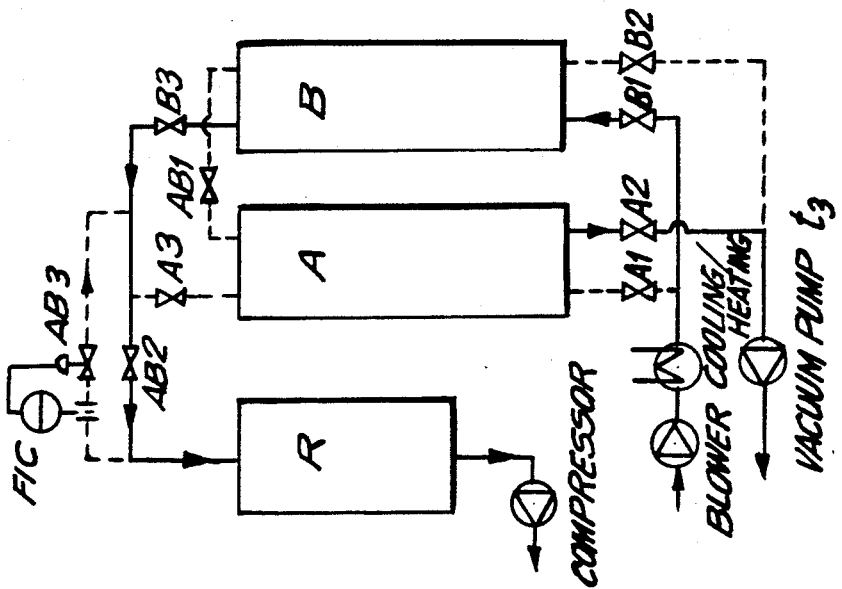
Figure 2B:
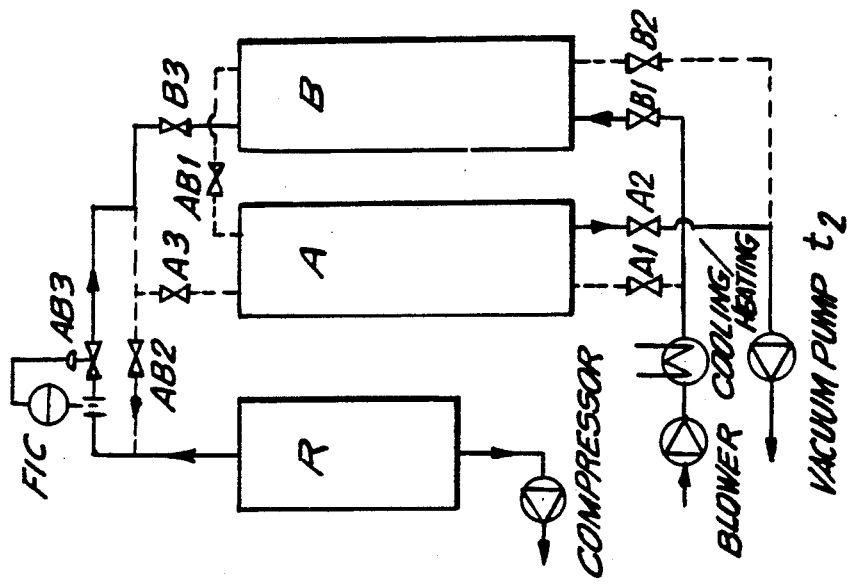
Figure 2A:
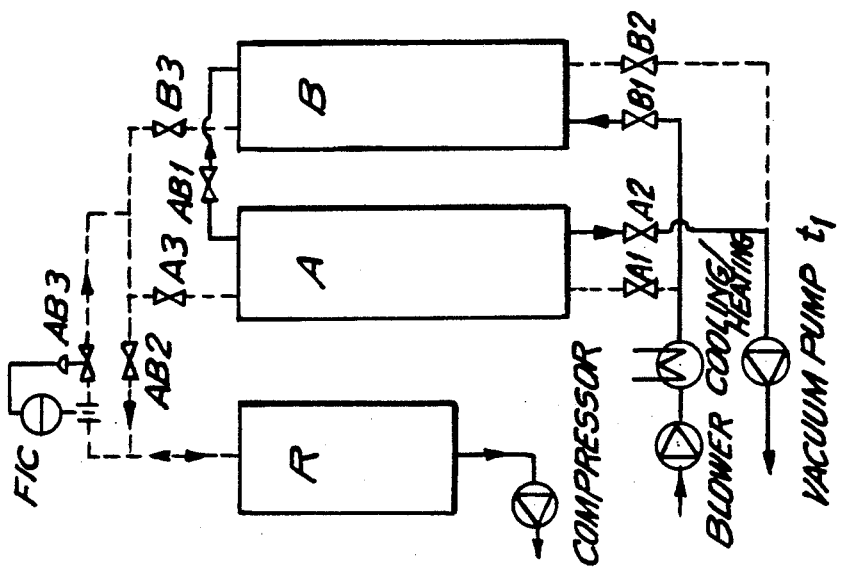
Figure 3C:
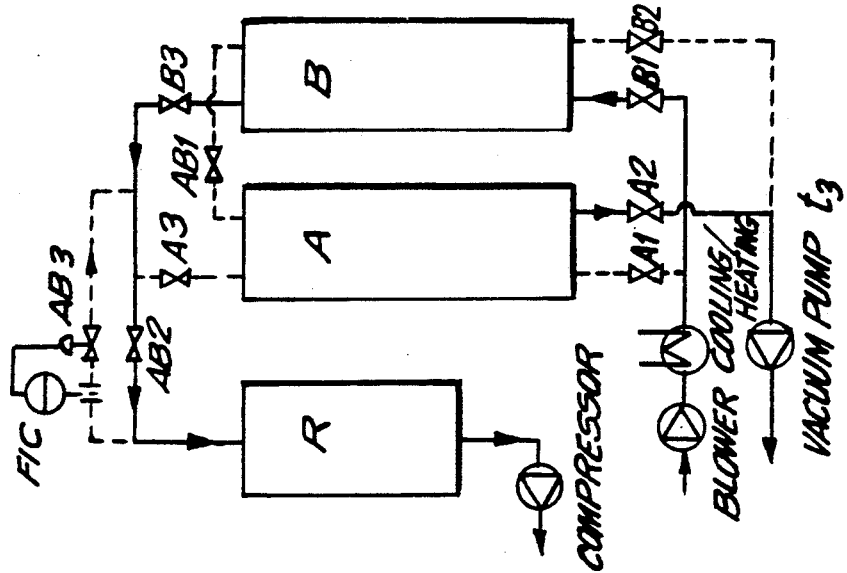
FIGS. 3a, 3b, 3c, 3d, 3e and 3f show process flow and pressure flow for example 3.
Figure 3B:
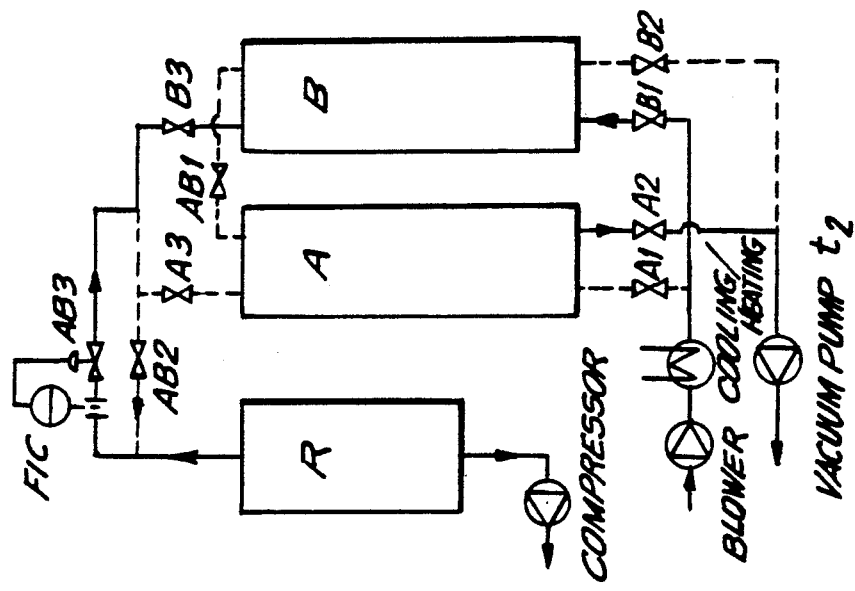
Figure 3A:
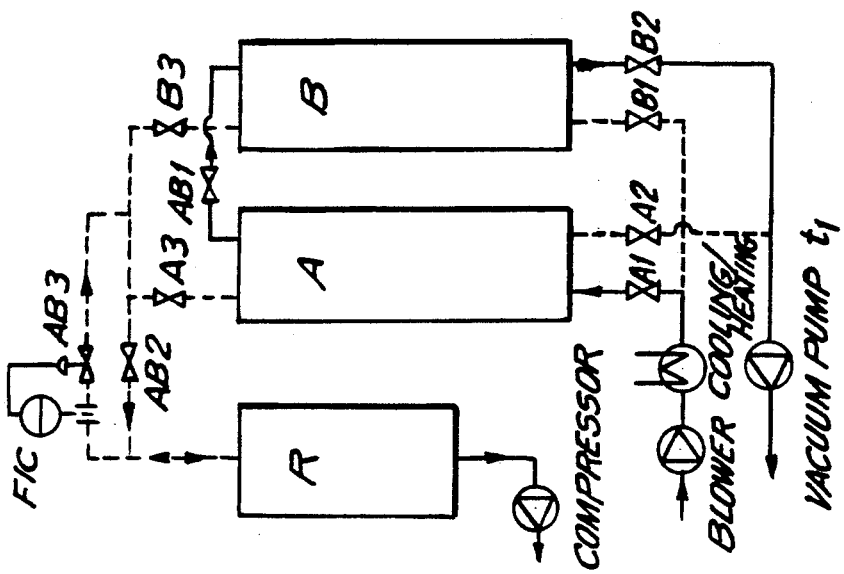
Figure 3D:
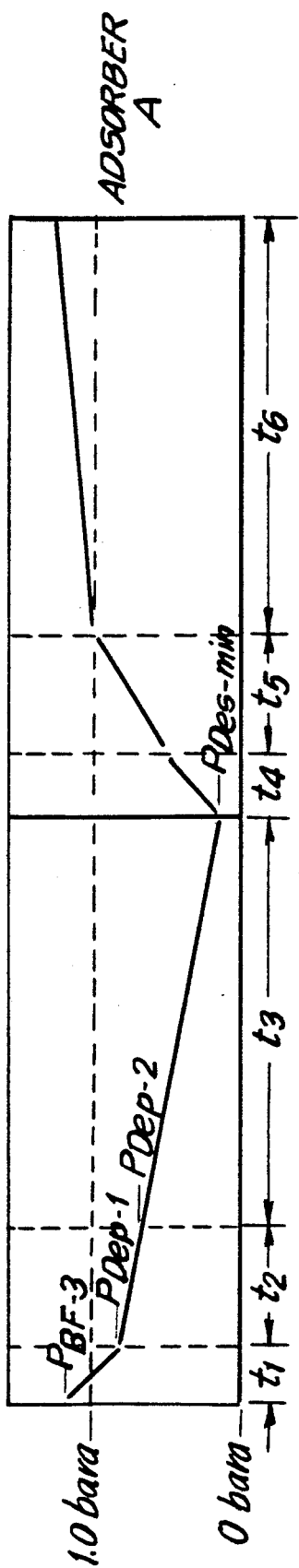
Figure 3E:
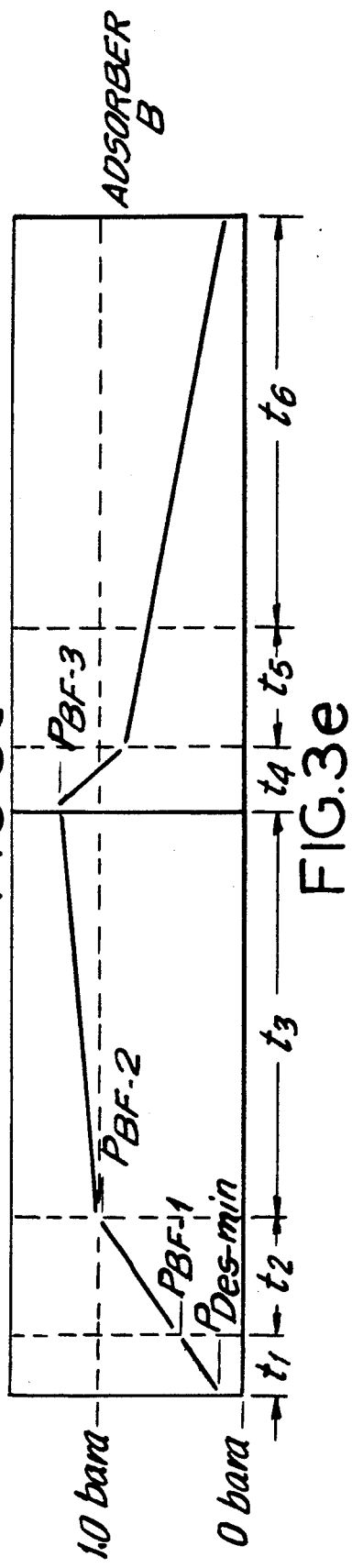
Figure 3F:
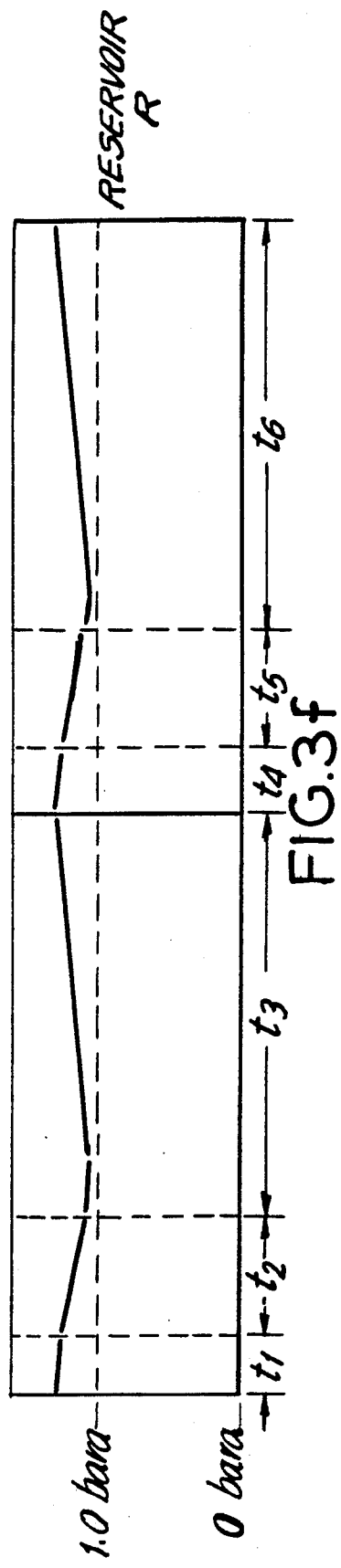

An installation corresponding to FIG. 1 was used. The process flow and pressure flow are shown in FIGS. 2a through 2f. The product gas is oxygen-rich air.

Time $t_1$; 0 to 4 seconds.

An air blower with an output of 275 Nm³/h delivered air via valve B1 into adsorber B, whereupon the pressure in adsorber B rose from $P_{Des-min}=220$ mbar to $P_{BF-1}=650$ mbar, and at the same time a maximum pressure $P_{BF-3}=1,500$ mbar (abs) was reduced in adsorber A in that gas flowed into adsorber B at the top end via valve AB1, and evacuation was effected at the bottom end via valve A2 using a vacuum pump, the pressure in adsorber A falling to $P_{Dep-1}=990$ mbar. Reservoir R delivered product gas under a pressure of about 1.5 bar (pressure always indicated as abs.).

Time $t_2$; 4 to 19 seconds.

Adsorber A was evacuated via valve A2 to $P_{Dep-2}=440$ mbar, the top end of adsorber A being closed. Adsorber B was charged with air from the air compressor at the bottom end via valve B1 to $P_{BF-2}=1$ bar, and at the same time it was filled with gas from the reservoir R via a volume control valve AB3 and valve B3, the pressure in the reservoir falling from about 1.5 bar to 1.1 bar. Product gas continued to be stripped off from reservoir R.

Time $t_3$; 19 to 45 seconds.

Evacuation of adsorber A was continued, a final pressure of 220 mbar being reached. Air flowed into adsorber B via valve B1, via valve B3 product gas was introduced via valve AB2 into reservoir R and the pressure in adsorber B and in the reservoir R reached a final pressure of 1.5 bar.

Times $t_4/t_5/t_6$; 45 to 90 seconds.

The process proceded analogously to times $t_1/t_2/t_3$, except that adsorber A was exchanged for adsorber B.

An amount of product of 27.8 Nm³/h having an $O_2$ concentration of 93% was stripped off from reservoir R. The maximum $O_2$ concentration which can be achieved was 96% at a product amount of 22.9 Nm³/h.

EXAMPLE 2

The process procedure according to example 1 was chosen. The cycle time was $t_1=4$ seconds, $t_2=15$ seconds, $t_3=41$ seconds. The crude gas issuing had the following composition (vol. %): $H_2$: 10%; Ar: 15%; $N_2$: 50%; $CH_4$: 25%. The final pressure of the desorption was 220 mbar and the maximum final pressure of the adsorption was 1.5 bar.

Enrichment of argon was achieved, i.e. at a crude gas amount of 270 Nm³/h a product gas amount of 44 Nm³/h having the composition (vol. %) of 49.5% argon, 51% $H_2$ and 0.5% $N_2$ was obtained.

EXAMPLE 3

The same installation according to examples 1 and 2 was used. The product gas is oxygen-enriched air, and the process flow and pressure flow are shown in FIGS. 3a through 3f.

Time $t_1$; 0 to 8 hours.

Air flowed via a blower through valve A1 into adsorber A, the top discharge end of adsorber A being connected to the top discharge end of adsorber B via valve AB1, the pressure in adsorber A decreased from its highest value of $P_{BF-3} = 1.1$ bar to a lower value of $P_{Dep-1} = 900$ mbar, since adsorber B was connected at the bottom end via valve B2 to a vacuum pump, whereupon the pressure in adsorber B rose from its lowest value $P_{Des-min} = 195$ mbar to $P_{BF-1} = 400$ mbar. Reservoir R delivers product gas under about 1.1 bar.

Time $t_2$; 8 to 20 seconds.

Adsorber B was charged at the bottom end via valve B1 with air from the air blower, whereupon the pressure in adsorber B rose to about 1 bar.

At the same time, adsorber B was filled with product gas from reservoir R, volume control valve AB3 and valve B3. The pressure in reservoir R in this way fell to about 1 bar and delivered product gas via the product compressor. Adsorber A was evacuated via valve A2, the pressure thereof dropping to $P_{Dep-2}$.

Time $t_3$; 20 to 60 seconds.

Adsorber B was supplied with air as at time $t_2$, the pressure rising to a final value of 1.1 bar. Product gas flowed at the top end of adsorber B via valves B3, AB2 into reservoir R, product gas being stripped off via the product compressor. Adsorber A was evacuated as in the interval $t_2$, the pressure dropping to a final value $P_{Des-min} = 195$ mbar.

Times $t_4/t_5/t_6$; 60 to 120 seconds.

The procedure was repeated analogously to times $t_1/t_2/t_3$, except that adsorbers A and B are interchanged in their functions.

A product amount of 17.5 Nm³/h was to be obtained at the product compressor at an $O_2$ concentration of 93%. The maximum $O_2$ concentration to be achieved was 95.8 vol. %.

EXAMPLE 4

Figure 4:
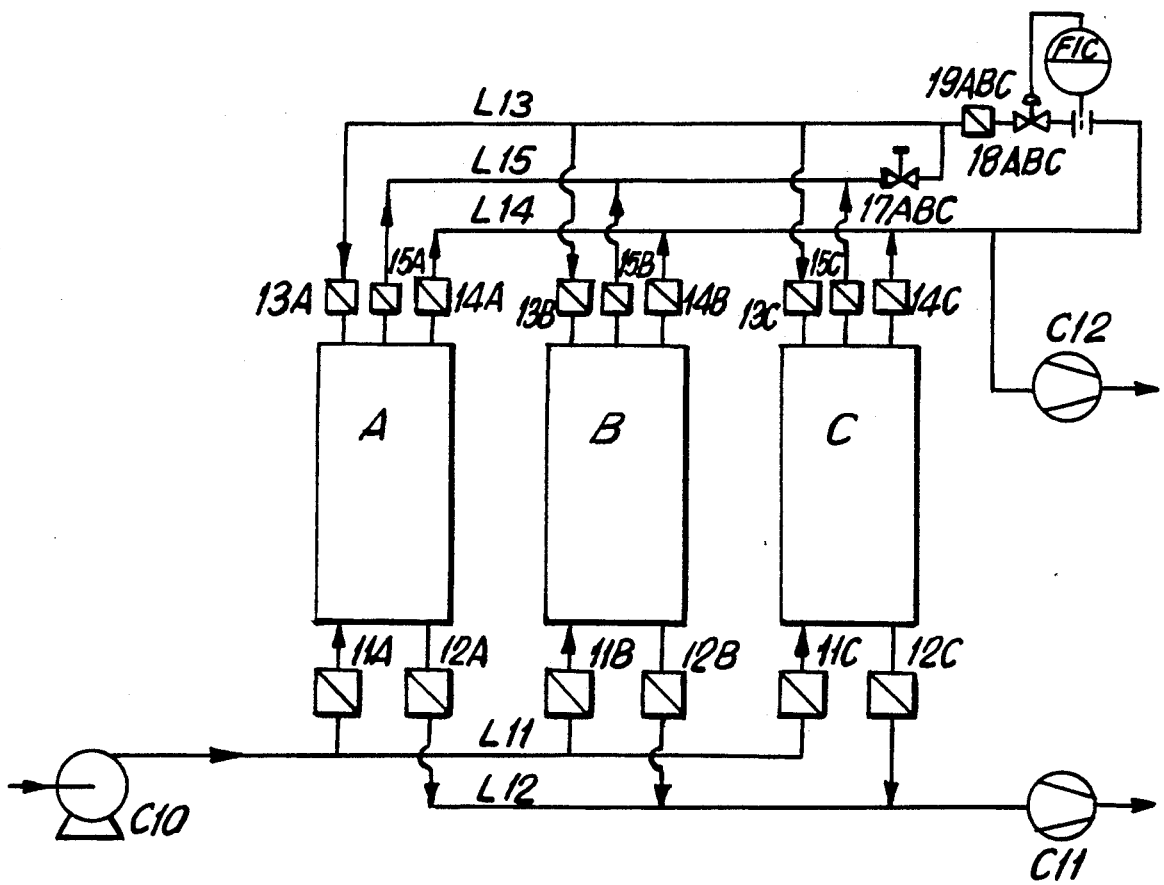
FIG. 4 shows an installation for carrying out the present process as shown in example 4.
Figure 5A:
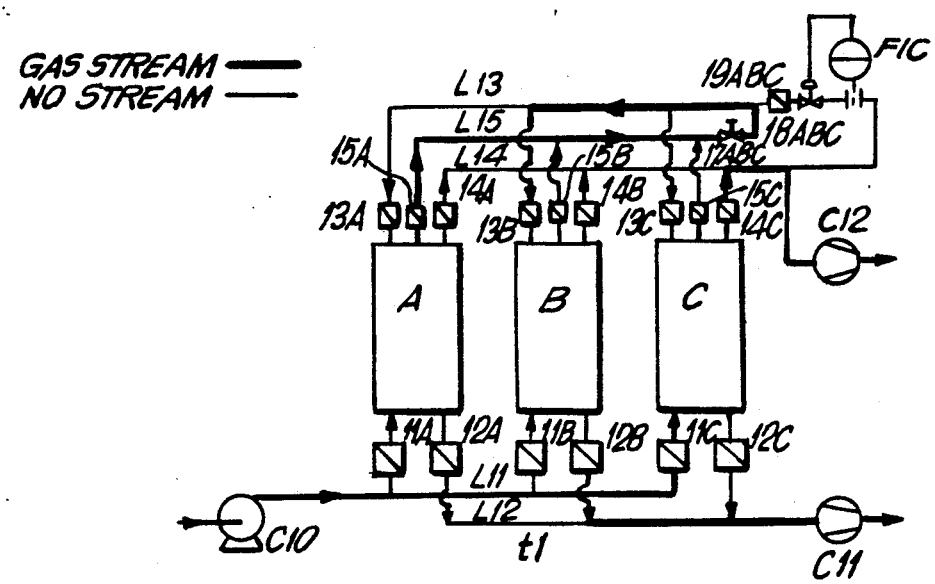
Figure 5B:
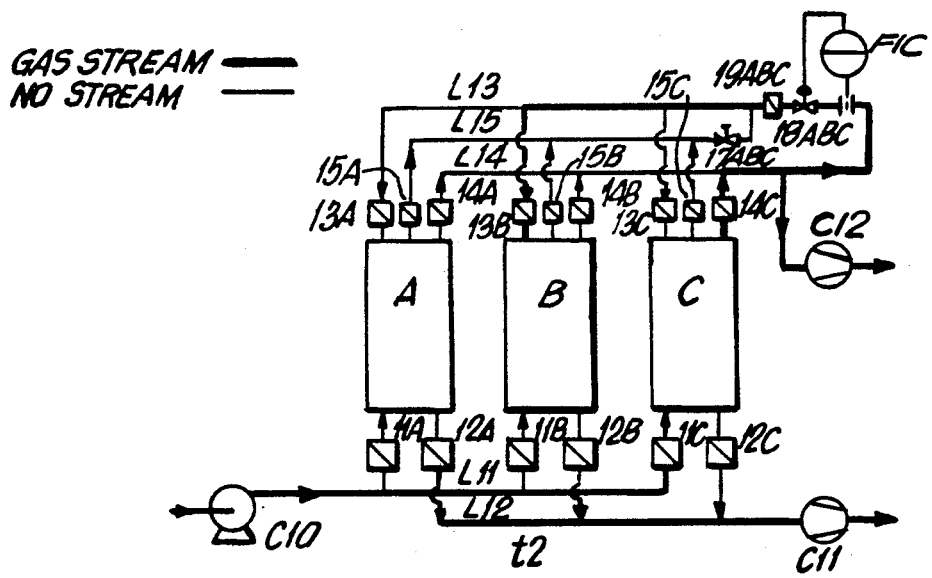
Figure 5C:
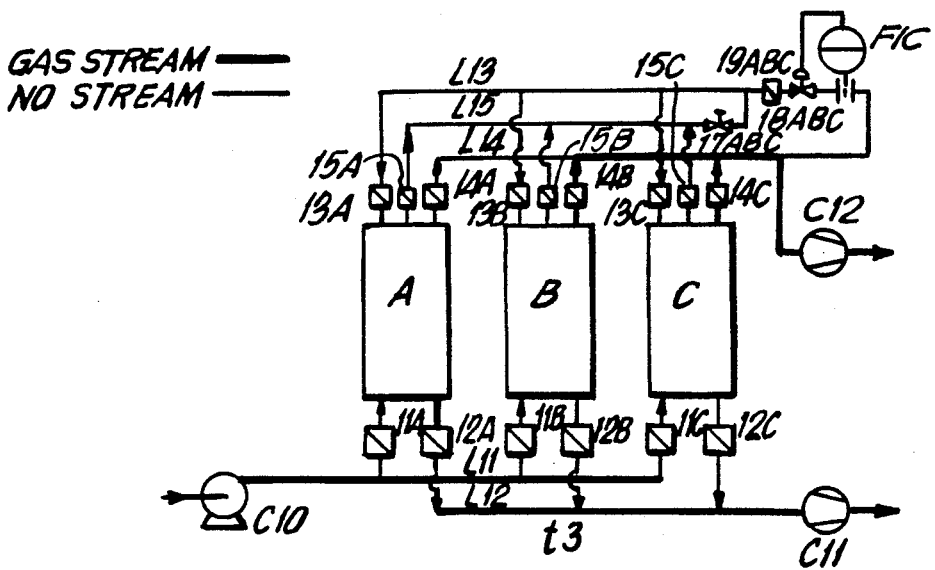

An installation according to FIG. 4 was chosen. (It should be noted that the pilot installation of FIG. 1 consisted of part of the overall pilot installation of FIG. 4).

FIG. 4 shows a VSA installation, e.g. for $O_2$-enrichment of air, such as are already in operation in practice.

Whilst one adsorber is charged with air, a second adsorber is evacuated and a third adsorber is filled again to the adsorption pressure with $O_2$-rich product gas.

In accordance with the processes according to the invention (examples 1 and 3), the capacity of such a 3-adsorber VSA installation can be increased considerably in that two adsorbers are simultaneously charged with a time lag, e.g. with an increased amount of air, and the third adsorber is evacuated, and in the case of an already existing installation the vacuum pump would have to be increased in output in accordance with the increased amount of air.

There is also the possibility of designing a new installation with three adsorbers corresponding to the process according to the invention. This is always appropriate if installations of very high capacity are planned and an installation with two passes is not appropriate for cost reasons or outsize dimensions, e.g. on valves, can no longer be used. It is in this way possible to operate an installation at the same capacity with three 3 adsorber units instead of 6 adsorbers.

The process corresponding to example 3 has been chosen to demonstrate this process according to the invention. It should be emphasized that the process of example 1 can of course also be used. The process flow and pressure flow can be seen from FIGS. 5a through 5f.

Time $t_1$; 0 to 6 seconds.

Air blower C10 delivered air into adsorber C via valve 11C, adsorber produces $O_2$-enriched air via valve 14C in product compressor $C_{12}$, pressure in adsorber C $P_{BF-3} = 1.5$ bar.

Air from compressor C10 flowed through partly opened valve 11A into adsorber A, the pressure in adsorber A dropping from $P_{BF-3} = 1.5$ bar to $P_{Dep-1} = 900$ mbar, since valve 15A at the top end of adsorber A was open and expansion gas flowed via the manual valve 17ABC, valve 13B into the top end of adsorber B, this adsorber had its lowest pressure $P_{Des-min} = 205$ mbar and as a result of the gas from adsorber A the pressure in adsorber B rose from $P_{Des-min}$ to $P_{BF-1} = 400$ mbar, the bottom end of adsorber B at the same time being connected via valve 12B to a vacuum pump C11.

Time $t_2$; 6 to 16 seconds.

Adsorber C was identical in operation to that at time $t_1$. Adsorber A was evacuated via valve 12A from $P_{Dep-1}$ to $P_{Dep-2}$. Adsorber B was charged with air at the bottom end via partly opened valve 11B, filling with $O_2$-enriched air from adsorber C taking place at the same time, and in particular via volume control valve 18ABC, valve 19ABC, valve 13B, the pressure in adsorber B rising from $P_{BF-1} = 400$ mbar to $P_{BF-2} = 1.15$ bar. The pressure in adsorber C dropped here from 1.5 bar to about 1.35 to 1.4 bar.

Time $t_3$; 16 to 35 seconds.

Adsorber C was in operation as at time $t_1$. Adsorber B was charged with air at the bottom end via valve 11B, $O_2$-enriched air left adsorber B at the top discharge end, valve 14C being opened slowly, i.e. the final pressure $P_{BF-3} = 1.5$ bar was reached. Adsorber A was evacuated as at time $t_2$, the minimum desorption pressure $P_{Des-min} = 205$ mbar being reached.

Time $t_4$; 35 to 41 seconds.

Analogously to time $t_1$, adsorber C in operation as adsorber A ($t_1$), adsorber B started the second part of the adsorption, adsorber A in operation as adsorber B ($t_1$).

Time $t_5$; 41 to 51 seconds.

Analogously to time $t_2$, adsorber C in operation as adsorber A ($t_2$). Adsorber B was at adsorption under 1.5 bar, adsorber A in operation as adsorber B ($t_2$).

Time $t_6$; 51 to 70 seconds.

Analogously to time $t_3$, adsorber C at evacuation as adsorber A ($t_3$), adsorber B at adsorption under 1.5 bar, adsorber A at adsorption operation under 1.5 bar as adsorber B ($t_3$).

Thereafter, the adsorbers were changed over again, i.e. adsorber A started as adsorber C at time $t_1$, adsorber B started as adsorber A at time $t_1$, adsorber C started as adsorber B at time $t_1$.

During this process, $O_2$-enriched air at 36 $Nm^3/h$ with an $O_2$ concentration of 93 vol. % was stripped off via product compressor C12, the amount of air from the air compressor here being 352 $Nm^3/h$.

Figure 6:
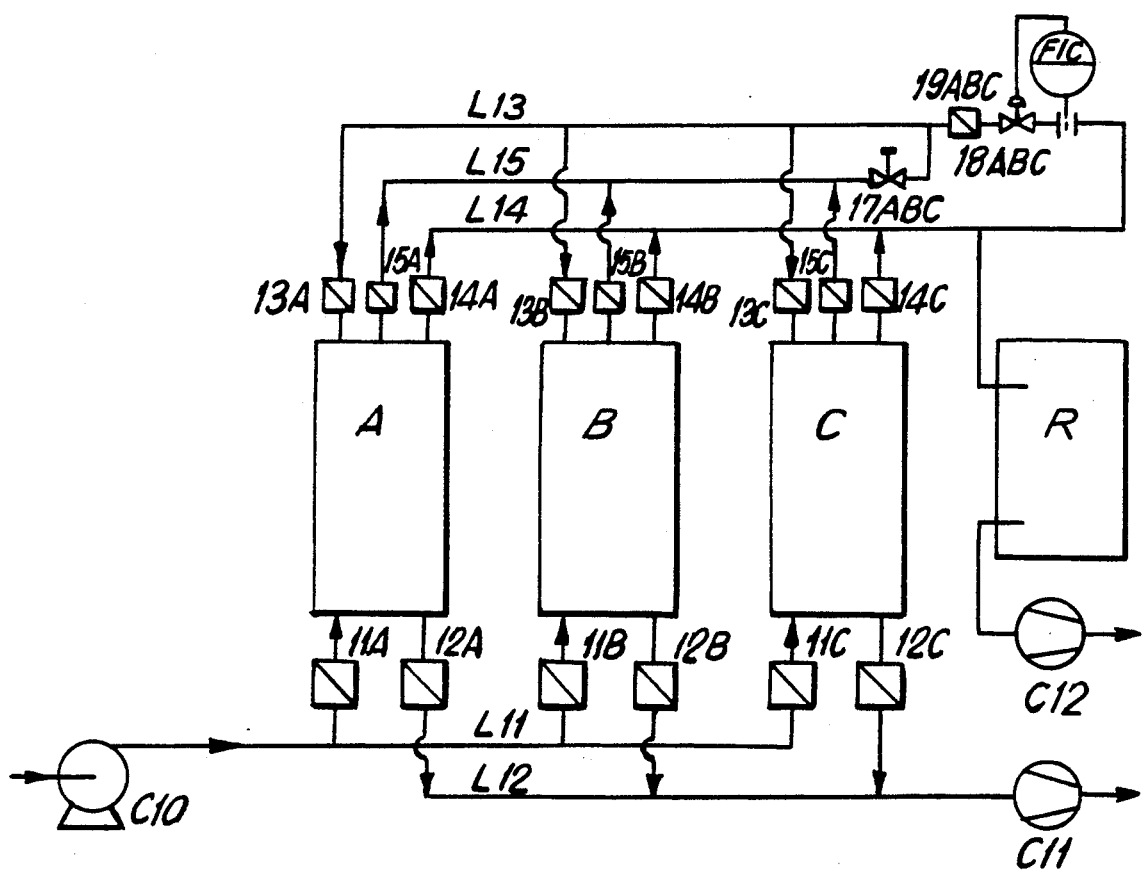
FIG. 6 shows a 3-adsorber system which can be employed in the present process.
Figure 7A:
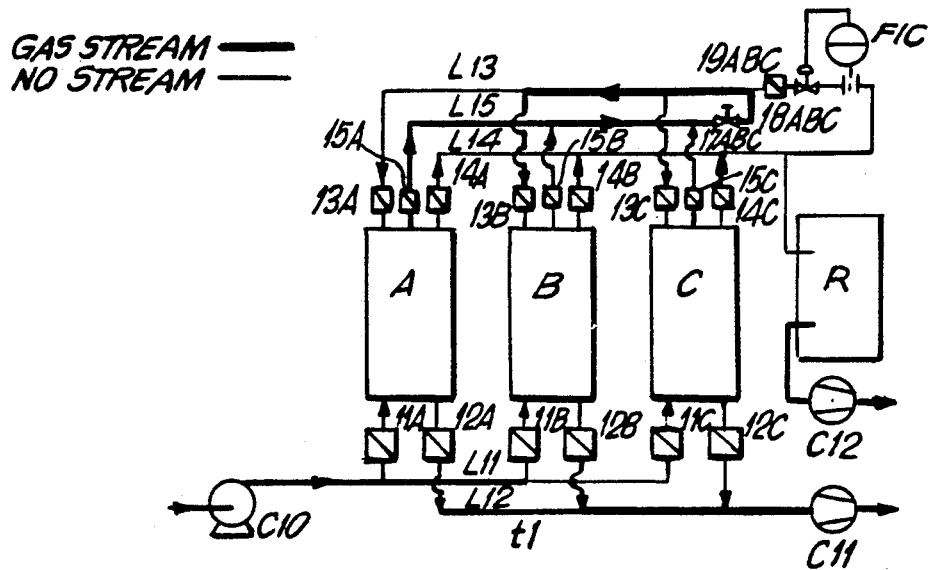
Figure 7B:
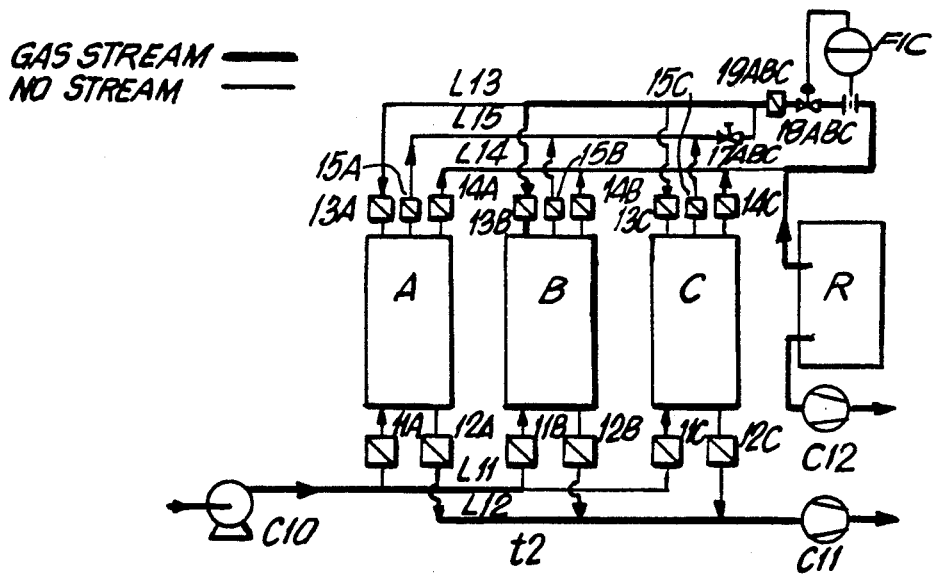
Figure 7C:
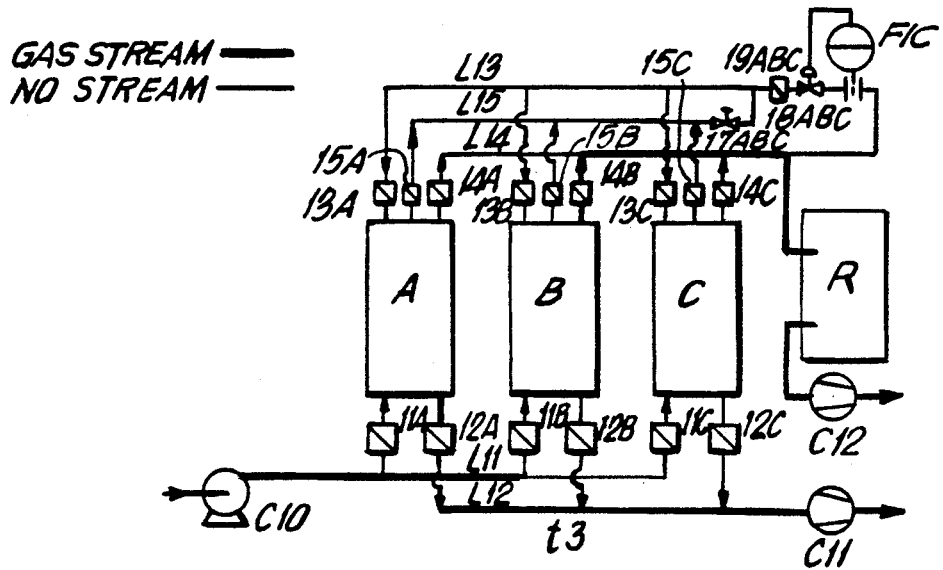

The 2-adsorber VSA process according to the invention can be employed in a further case in the field of operation of 3-adsorber VSA processes. Such a 3-adsorber system is shown in FIG. 6, which corresponds to the system and process flow of FIG. 4 apart from the compensation vessel R.

In previous processes, a 3-bed VSA installation had to be stopped if an adsorber unit dropped out, e.g. by swirling of the adsorbent or malfunction of a valve. With the aid of the processes according to the invention, in the event of malfunction e.g. of adsorber C, this adsorber can be removed from the process, e.g. by closing its valves, or additionally by positioning blanks between its valves and gas lines L11/L12/L13/L14/L15.

The process flow and pressure flow of the remaining two adsorbers A and B are shown in FIGS. 7a through 7g, and in particular in accordance with example 1. Operation in accordance with example 3, however, is also possible. The process flow shown and the installation construction (the remaining installation) of FIGS. 7a through 7g are identical to FIG. 1 and the diagrams 2a and 2b, and for this reason another (identical) description is superfluous. A3 on FIG. 1 and 11C, 13A, 13C, 14A, 14B, 15B and 15C on FIGS. 4 and 6 represent valves.

What is claimed is:

1. Process for adsorptive separation of crude gas mixtures by vacuum swing adsorption in two containers filled with adsorbent said containers being adsorbers A and B which are provided with a bottom and top inlet and discharge end, the gas content which is adsorbed less strongly, if at all, (raffinate) being obtained under reduced pressure, said process comprising
    (F1) operating the two adsorbers A and B alternately so that the crude gas fed into the adsorbers is not stopped at any time during the course of the process, a vacuum pump remaining continuously connected to the adsorbent packing,
    (a) at time $t_1$ depressurizing adsorber A at the top end, the gas released in this way flowing into the top end of an evacuated adsorber B, adsorber A being connected at the bottom end to a vacuum pump and adsorber B being filled at the bottom end with crude gas,
    (b) at time $t_2$ evacuating adsorber A and filling adsorber B at the top end with raffinate from a raffinate reservoir R, adsorber B being filled at the bottom end under reduced pressure with crude gas,
    (c) at time $t_3$, evacuating adsorber A at the bottom end and filling adsorber B the bottom end with crude gas, or crude gas flows through adsorber B at the bottom end, starting at a pressure of 1 bar, and stripping off the gas content which is adsorbed less strongly as the product at the top end of adsorber B,
    (d) proceeding further with the process by repeating the times $t_1$, $t_2$ and $t_3$ adsorbers A/B being changed over, or alternatively in a two-adsorber VSA process
    (e) at time $t_1$ depressurizing adsorber A at the top end, the gas released in this way flows into the top end of the adsorber B, which is operated under reduced pressure, charging adsorber A at the bottom end with crude gas, adsorber B is connected at the bottom end to a vacuum pump, but the pressure in adsorber B rises here due to the entry of gas from adsorber A, and the pressure in adsorber A falls,
    (f) at time $t_2$ the process proceeding analogously to (1b),
    (g) at time $t_3$ the process proceeding analogously to (1c),
    (h) the process proceeding further by repeating the times $t_1$, $t_2$ and $t_3$, adsorbers A/B being changed over.

2. Process according to claim 1, wherein the release of the gas content adsorbed less strongly, if at all, takes place under 1 bar or 1 bar to 3 bar.

3. Process according to claim 1, wherein the entire cycle time $t_1+t_2+t_3$ is 10 to 120 seconds.

4. Process according to claim 1, wherein the pressure at time $t_1$ of the adsorber to be depressurized drops to below 1 bar.

5. Process according to claim 1, wherein (a) oxygen is obtained adsorptively from air or (b) argon is obtained adsorptively from nitrogen.

6. A VSA separation process based on three beds, two beds of which operate according to the process of claim 1, said separation process based on three beds being changed over automatically to said two bed process in the event of malfunction of a valve of an adsorber unit, so that operation is maintained only with two adsorbers.

7. A VSA separation process based on three adsorber units, two of which operate according to the process of claim 1, the three adsorber units being chosen so that one adsorber is connected to a vacuum pump within time $t_1+t_2+t_3$ and two adsorbers are charged with crude gas with a time lag, the time lag being $t_1+t_2+t_3$, and the adsorption time of an adsorber is $2\times(t_1+t_2+t_3)$.

* * * * *